Nov. 10, 1964   L. A. H. RIDDLE   3,156,314
VEHICLES FOR TRAVELLING OVER LAND AND/OR WATER
Filed July 18, 1960   2 Sheets-Sheet 1

Inventor
LAVIS A. H. RIDDLE
By Cameron, Kerkam & Sutton
Attorneys

Nov. 10, 1964   L. A. H. RIDDLE   3,156,314
VEHICLES FOR TRAVELLING OVER LAND AND/OR WATER
Filed July 18, 1960   2 Sheets-Sheet 2
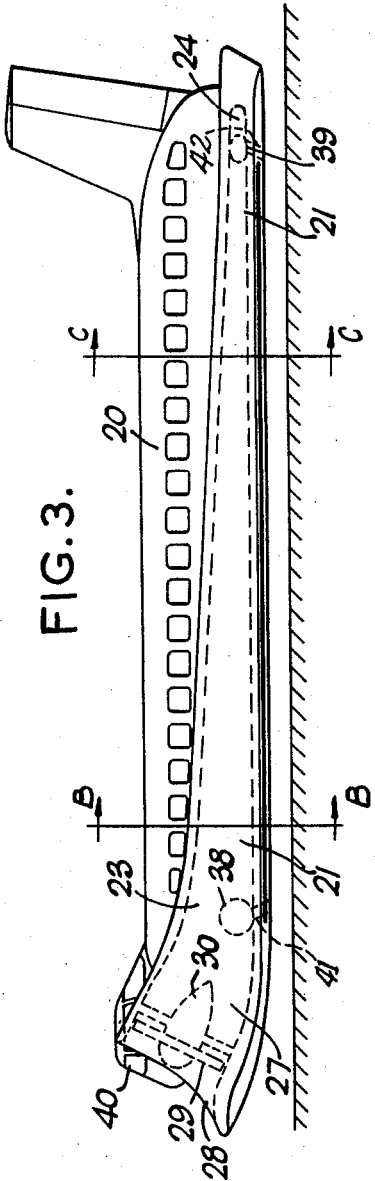
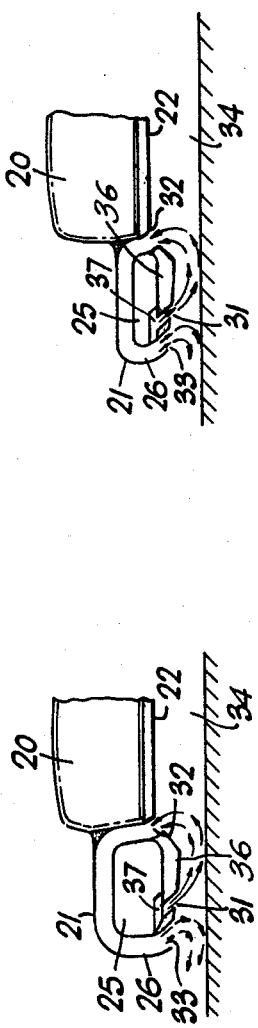
Inventor
LAVIS A. H. RIDDLE
By Cameron, Kerkam & Sutton
Attorneys

United States Patent Office

3,156,314
Patented Nov. 10, 1964

3,156,314
VEHICLES FOR TRAVELLING OVER LAND
AND/OR WATER
Lavis Albert Henry Riddle, East Cowes, Isle of Wight,
England, assignor to Hovercraft Development Limited,
London, England, a British company
Filed July 18, 1960, Ser. No. 43,479
Claims priority, application Great Britain July 21, 1959
14 Claims. (Cl. 180—7)

This invention relates to vehicles for travelling over land and/or water, which are partly or wholly supported above the surface over which the vehicle is travelling by one or more cushions of pressurised gas. Such vehicles are described in the specification of the commonly owned co-pending application of Christopher Sydney Cockerell, Serial No. 627,925, filed Dec. 12, 1956. In such vehicles the cushion or cushions of pressurised gas are at least partly formed and maintained by one or more curtains of fluid issuing from a supply port, or supply ports, in the bottom of the vehicle, the curtain or curtains flowing across the gap which in operation exists between the vehicle structure and the surface.

The invention is also applicable to a mobile platform and the term "vehicle" as used herein is intended, where the context permits, to include a mobile platform.

In the specification of the commonly owned co-pending applications Serial Number 837,428, also filed by Christopher Sydney Cockerell on September 1, 1959, now abandoned in favor of continuation-in-part application Serial No. 326,497, filed November 27, 1963, there is described inter alia a vehicle of this type in which at least part of the fluid forming the curtain is recovered through one or more recovery ports in the bottom of the vehicle inboard of the supply port or ports, the recovered fluid being transferred by means of a transfer duct or transfer ducts to one or more transfer supply ports formed in the bottom of the vehicle and situated on that side of the supply port or ports remote from the pressurised cushion. In the vehicle particularly described, the supply duct or ducts which feed the fluid to the supply port or ports and the transfer duct or ducts cross one another. This gives rise to constructional difficulties, and also increases aerodynamic, or the like, losses in the ducts.

It is an object of the invention to provide a system of supply and recovery ducts which enable a simplified form of construction to be obtained and in which the aerodynamic, or the like, losses are reduced. According to the invention there is provided a vehicle for travelling over a surface, which is wholly or partly supported above that surface by a cushion of pressurised gas, which is formed and maintained by at least one curtain of fluid issuing from a supply port or ports formed in the bottom of the vehicle and extending near the periphery thereof, at least part of the curtain-forming fluid being recovered through at least one recovery port formed in the bottom of the vehicle parallel to and inboard of the supply port, the recovered fluid issuing from at least one transfer supply port formed in the bottom of the vehicle parallel to the supply port and situated on the side of the supply port remote from the recovery port, in which the fluid to the supply port is supplied through a tubular supply duct having its longitudinal axis substantially parallel to the periphery of the bottom of the vehicle and the fluid recovered through the recovery port is transferred to the transfer supply port by a transfer duct which is part annular in vertical cross-section and partially surrounds the supply duct.

In vehicles of this type the fluid used for forming the curtains and the gas for the cushions is generaly air, and in the following descriptions of specific examples of the invention this will be assumed to be the case. Other gases, such as exhaust gases, and possibly steam, may also be used.

The invention will be more readily understood from the following descriptions of certain embodiments of the invention in conjunction with the accompanying drawings, in which:

FIGURE 3 is a side view of an alternative form of vehicle embodying the invention;

FIGURE 4 is a vertical cross-section, showing one half of the vehicle, on the line B—B of FIGURE 3;

FIGURE 5 is a similar cross-section to FIGURE 4 on the line C—C of FIGURE 3.

Figure 1:
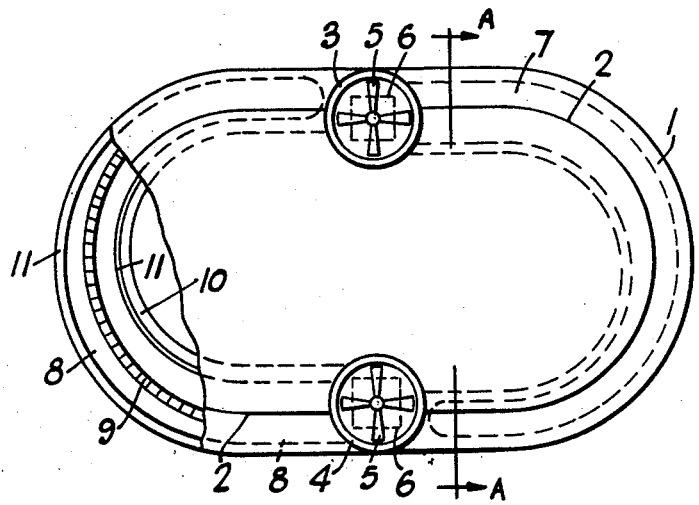
FIGURE 1 is a plan view of a vehicle embodying the invention, with part of the outer skin removed.
Figure 2:
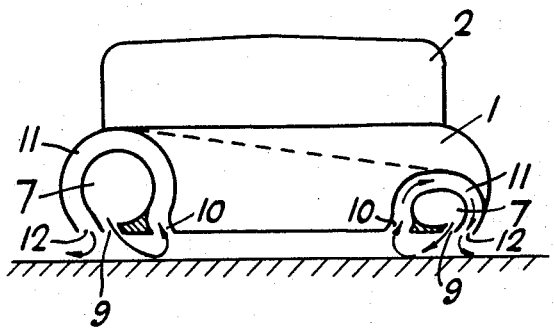
FIGURE 2 is a vertical cross-section on the line A—A of FIGURE 1.

The vehicle illustrated in FIGURES 1 and 2 is approximately oval in plan form, having rounded ends, and comprises a body portion 1 and a superstructure 2. Midway along each side of the vehicle are positioned vertical air intakes 3 and 4 each containing a propeller 5 driven by a motor 6. The air intakes 3 and 4 communicate with two supply ducts 7 and 8 respectively, formed in the body portion 1, adjacent and parallel to the periphery thereof. The supply duct 7 connected with air intake 3 continues round the periphery of the vehicle to intake 4, and similarly supply duct 8 connected to air intake 4 continues round to the intake 3. There is thus a substantially continuous supply duct round the periphery of the vehicle, divided into two sections. A continuous annular supply port 9 is formed in the bottom of the supply ducts 7 and 8.

Spaced slightly inboard of the supply port 9, and parallel thereto, is an annular recovery port 10. The recovery port is connected by a transfer duct 11 with a transfer supply port 12. The transfer supply port 12, positioned immediately outboard of the supply port 9, is annular in form. It does not, however, extend right round the vehicle, there being short gaps beneath the air intakes 3 and 4. The transfer duct 11, which also only extends between the air intakes, partially surrounds the supply ducts 7 and 8. By so arranging the ducts the crossing or inter-leaving of the ducts only occurs at the air intakes.

In such an arrangement as described above, the curtain formation for the major part of the periphery is as shown in FIGURE 2. Beneath the air intakes, however, the curtain is of a simple form in which, after issuing in a downward and inward direction from the supply port 9, is deflected round and outwards by the cushion, the curtain air flowing into the surrounding atmopshere. These curtains would be weaker than the curtain for the remainder of the periphery if the mass flow to the unit length was made constant all round the periphery. The simple curtains, however, can be strengthened by increasing the mass flow at these locations, for example, by making the supply port wider. The recovery port 10 and also the transfer supply port 12, can be made continuous round the periphery, and in this case the recovered air will need to be diverted round the air intakes.

The invention is especially advantageous when applied to a side-wall vehicle of the kind described in the specification of the commonly owned co-pending application Serial No. 819,968, filed by Christopher Sydney Cockerell on June 12, 1959, since an assemblage of ducts according to the invention may constitute each of the side walls, and entry to the inner supply duct can be restricted to one end of the duct in each case. Such a vehicle is illustrated in FIGURES 3, 4 and 5 of the accompanying drawings.

The vehicle has a main body portion 20, with a side wall 21 extending along each side of the main body portion, depending below the bottom 22 thereof. Each side wall comprises a central tubular duct which forms a supply duct 25. The outer skin of the side wall is spaced from the supply duct and forms a transfer duct 26 as shown. The transfer duct extends round three sides of the supply duct, the bottom portion of the latter being sealed off to form a buoyancy chamber indicated at 36. Each supply duct 25 tapers in cross-section from one end to the other, being larger at the forward end 23 than at the rear end 24.

The forward end of each supply duct communicates via a further duct 27 with a forward-facing air intake 28. Mounted within each intake 28 is a propeller 29 driven by a motor 30.

Formed in the bottom of each side wall is a supply port 31 communicating with the supply duct 25, a recovery port 32 inboard of the supply port 31 and communicating with the inboard part of the transfer duct 26, and a transfer supply port 33 immediately outboard of the supply port 31 and communicating with the outboard part of the transfer duct 26.

In operation, air is drawn in through the intakes 28 and forced into the ducts 27 and then through the supply ducts 25 by the propellers 29. Air issues from the supply ports 31 in the form of a curtain, with a downward and inward direction. The air meets the surface over which the vehicle is operating and is then deflected round and upwards by the pressure of the pressurised cushion of air formed at 34 beneath the bottom 22 of the vehicle's main body 20. The deflected air flows into the recovery ports 32 and through the transfer ducts 26 to the transfer supply ports 33. From the transfer supply ports 33 the air issues with an initial downward and inward direction and then is deflected round and outward when the air flows to the surrounding atmosphere. This air flow can readily be seen in FIGURES 4 and 5.

Figure 6:
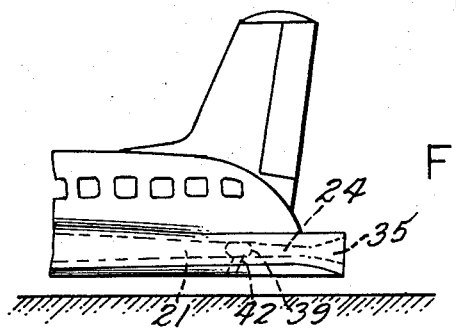
FIGURE 6 is a fragmentary side view of the rear end of an alternative form of vehicle embodying the invention.

The supply ducts 25 may be closed at their rearward ends 24, the vehicle being propelled by any suitable means, for example, vanes in the supply ports and/or transfer supply ports. Alternatively, as illustrated in FIGURE 6, the rearward ends of the supply ducts may form propulsion nozzles 35, air being expelled from the supply ducts through the nozzles.

Vanes 37 may be provided in the bottom of the supply ducts to ensure that the air flows into the supply ports 31.

As described in the above-mentioned commonly owned application Serial No. 819,968, the cushion formed beneath the vehicle body is contained at the front and rear of the vehicle by separately formed curtains. In the vehicle described above, and illustrated in FIGURES 3, 4 and 5, air is fed from the ducts 27 via a transverse duct 38 across the front of the main body of the vehicle. A curtain of air is formed by air issuing through a supply port 41 formed in the bottom of the duct. A further transverse duct 39 is formed across the rear of the main body of the vehicle and a curtain of air is formed through a supply port 42 formed in the bottom of the duct. The particular form of air curtain across the front and the rear of the vehicle may vary, and deflector vanes may be provided to re-deflect the air curtains inwards after they have been deflected outwards by the cushion.

The main body portion 20 of the vehicle provides space for passengers and/or freight, and a control cabin 40 is positioned at the front end. The bottom 22 of the body portion 20 may also be so formed as to provide a buoyancy chamber.

I claim:

1. A vehicle for travelling over a surface of the type which is at least partly supported above that surface by a cushion of pressurised gas comprising a body having at least one supply port formed in the bottom thereof and extending near the periphery thereof, means for supplying fluid to said supply port and causing said fluid to issue from said port and form a curtain of moving fluid travelling across the gap existing between said body and said surface, said curtain cooperating with said body and said surface in enclosing a gas-containing space between the bottom of said vehicle and said surface wherein said cushion of pressurised gas is formed and maintained, said fluid supplying means including a tubular supply duct having its longitudinal axis substantially parallel to the periphery of the bottom of said body, and means for drawing at least part of the curtain-forming fluid back into, and then causing the same to reissue from, said body including at least one recovery port formed in the bottom of said body parallel to and inboard of said supply port, at least one transfer supply port formed in the bottom of said body parallel to said supply port and situated on the side thereof remote from said recovery port, and a transfer duct connecting said recovery and transfer supply ports, said transfer duct being part annular in vertical cross-section and partially surrounding said supply duct.

2. A vehicle as claimed in claim 1 wherein said supply port is so constructed and arranged that the fluid issues therefrom in an inward direction relative to the periphery of said body.

3. A vehicle as claimed in claim 1 wherein said body is approximately oval shaped in plan with rounded ends, and wherein said fluid supplying means further includes a pair of air intakes one positioned midway along each side of said body, said supply duct being formed in two sections with ecah section connected to a corresponding one of said air intakes and extending around the periphery of said body to a point adjacent the other intake.

4. A vehicle as claimed in claim 3 wherein each of said supply duct sections tapers in cross-section from one end to the other, being larger at the end which is connected to one of said air intakes.

5. A vehicle for travelling over a surface of the type which is at least partly supported above that surface by a cushion of pressurised gas comprising a body having a plurality of supply ports formed in the bottom thereof and extending near portions of the periphery thereof, means for supplying fluid to said supply ports and causing said fluid to issue from said ports and form a plurality of curtains of moving fluid travelling across the gap existing between said body and said surface, said curtains cooperating with said body and said surface in enclosing a gas-containing space between the bottom of said vehicle and said surface wherein said cushion of pressurised gas is formed and maintained, said fluid supplying means including a plurality of tubular supply ducts having their longitudinal axes substantially parallel to portions of the periphery of the bottom of said body, and means for drawing at least part of the curtain-forming fluid back into, and then causing the same to reissue from, said body including a plurality of recovery ports formed in the bottom of said body parallel to and inboard of said supply ports, a plurality of transfer supply ports formed in the bottom of said body parallel to said supply ports and situated on the sides thereof remote from said recovery ports, and a plurality of transfer ducts connecting said recovery and transfer supply ports, said transfer ducts being part annular in vertical cross-section and partially surrounding said supply ducts.

6. A vehicle as claimed in claim 5 wherein said supply ports are so constructed and arranged that the fluid issues therefrom in an inward direction relative to the periphery of said body.

7. A vehicle for travelling over a surface of the type which is at least partly supported above that surface by a cushion of pressurized gas comprising an elongated body, at least one member extending along each side of said body and depending below the bottom thereof, each side member having a supply port formed in the bottom thereof and extending near the periphery of said body, means for supplying fluid to said supply ports and causing said fluid to issue from said ports and form a plurality of curtains of moving fluid travelling across the gap existing between said body and said surface, said curtains cooperating with said body and said surface in enclosing a gas-containing space between the bottom of said vehicle and said surface wherein said cushion of pressurized gas is formed and maintained, said fluid supplying means including a plurality of tubular supply ducts within said side members having their longitudinal axes substantially parallel to the sides of said body, and means for drawing at least part of the curtain-forming fluid back into, and then causing the same to reissue from, said side members including a plurality of recovery ports parallel to and inboard of said supply ports, a plurality of transfer supply ports formed in the bottom of said side members parallel to said supply ports and situated on the sides thereof remote from said recovery ports, and a plurality of transfer ducts connecting said recovery and transfer supply ports, said transfer ducts being part annular in vertical cross-section and partially surrounding said supply ducts so as to form parts of said side members.

8. A vehicle as claimed in claim 7 wherein said supply ports are so constructed and arranged that the fluid issues therefrom in an inward direction relative to the sides of said body.

9. A vehicle as claimed in claim 7 wherein each of said side members includes an outer skin partially surrounding and spaced from the supply duct therein, the space between said outer skin and said supply duct forming at least a portion of said transfer duct.

10. A vehicle as claimed in claim 7 wherein the bottom portion of each of said supply ducts is sealed off to form a buoyancy chamber.

11. A vehicle as claimed in claim 7 wherein said fluid supply means further includes an air intake connected to the front end of each of said supply ducts and means for forcing air from said intakes into said ducts, and wherein the rear ends of said supply ducts are so constructed and arranged as to form propulsion nozzles.

12. A vehicle as claimed in claim 7 wherein each of said supply ducts tapers in cross-section from one end to the other, being larger at the front end.

13. A vehicle as claimed in claim 7 including vanes in the bottoms of said supply ducts for directing the fluid into said supply ports.

14. A vehicle as claimed in claim 7 including means for forming additional curtain-containing fluid curtains at the front and rear of the vehicle body, said last named means comprising transversely extending ducts connected to and supplied with fluid from said supply ducts, and supply ports formed in the bottoms of said transverse ducts.

References Cited in the file of this patent
UNITED STATES PATENTS
2,939,649   Shaw _____ June 7, 1960
FOREIGN PATENTS
219,133   Australia _____ Nov. 24, 1958
OTHER REFERENCES
Publication: "Flight," Sept. 11, 1959, pages 195–198.